United States Patent [19]
Wilde et al.

[11] 3,986,620
[45] Oct. 19, 1976

[54] PALLETIZING APPARATUS FOR PIECE GOODS

[75] Inventors: Uwe I. O. R. Wilde; Jörg Teja Toaspern, both of Hamburg-Schenefeld, Germany

[73] Assignee: Interplan Intern. Planungsburo fur Forder- und Lagertechnik GmbH & KG, Hamburg, Germany

[22] Filed: June 21, 1974

[21] Appl. No.: 481,920

[30] Foreign Application Priority Data
July 7, 1973  Germany............................ 2334651

[52] U.S. Cl. ............................................... 214/6 P
[51] Int. Cl.² .................................... B65G 57/09
[58] Field of Search ............... 214/6 P, 6 H, 16 B

[56] References Cited
UNITED STATES PATENTS

| | | | |
|---|---|---|---|
| 983,892 | 4/1911 | Graham | 214/6 H |
| 1,988,204 | 1/1935 | Knudson | 214/6 H |
| 2,869,737 | 1/1959 | Thomas | 214/6 P |
| 3,013,648 | 12/1961 | Kovach | 214/6 H |
| 3,612,300 | 10/1971 | Berghgracht | 214/6 P |
| 3,836,018 | 9/1974 | Dawson | 214/6 P |

FOREIGN PATENTS OR APPLICATIONS 1,275,468  8/1968  Germany .......................... 214/16 P

*Primary Examiner*—M. H. Wood, Jr.
*Assistant Examiner*—John A. Pekar
*Attorney, Agent, or Firm*—Toren, McGeady & Stanger

[57] ABSTRACT

An apparatus for loading pallets with discrete cargo units such as sacks, boxes, crates and the like comprising a palletizing station with conveyor and transfer means for assembling cargo units supplied into layers suitable for compound stacking and transferring assembled layers onto pallets. One or two pallet storage and transfer tracks allow to move a selected one of a plurality of pallets into the transfer zone of the apparatus in which an assembled cargo layer may be transferred onto the pallet.

12 Claims, 12 Drawing Figures

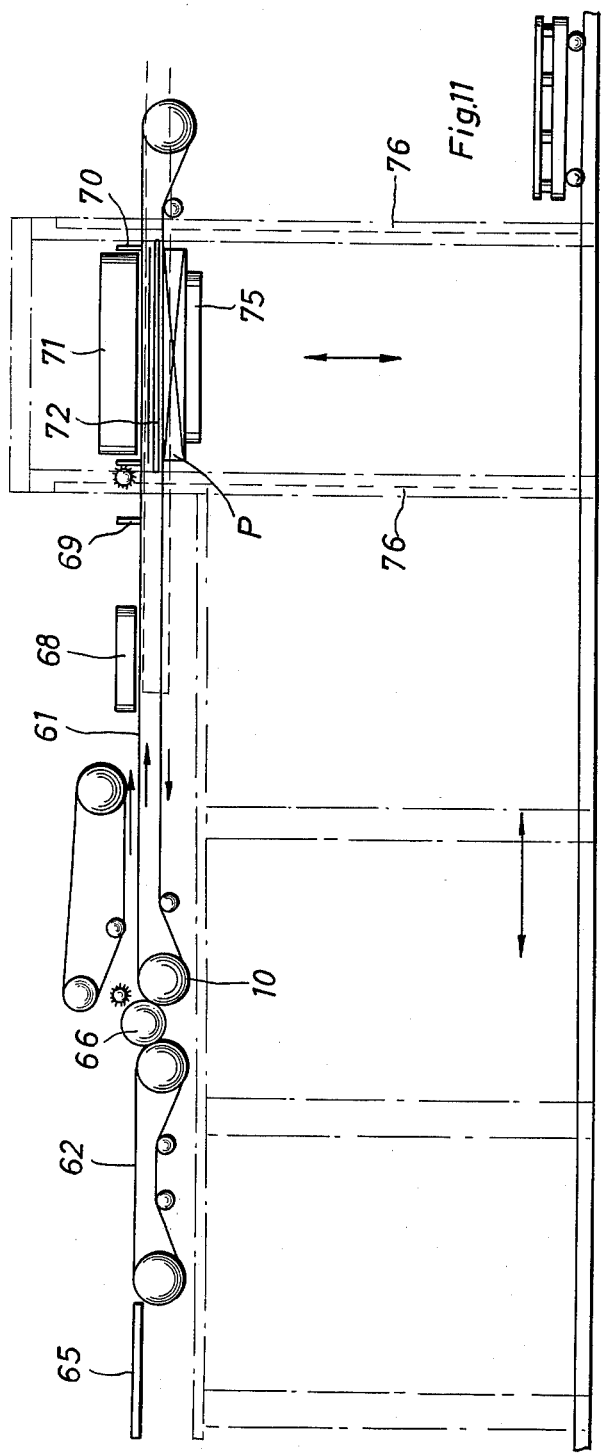

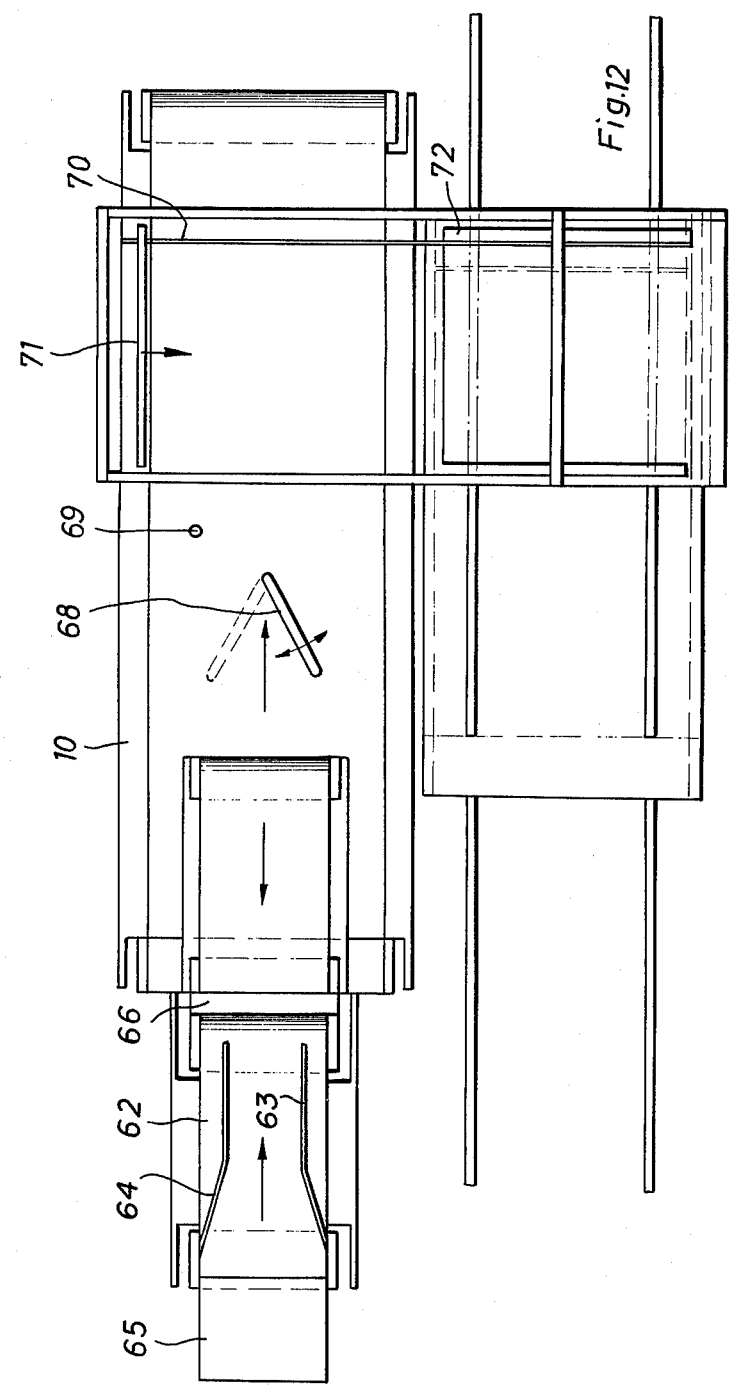

PALLETIZING APPARATUS FOR PIECE GOODS

The present invention relates to an apparatus for loading pallets with piece goods such as sacks, cardboard boxes, crates or the like wherein such piece goods are transferred by means of transfer devices onto individual pallets adapted to be raised or lowered by means of an elevating mechanism and wherein each pallet, after deposition of a layer of piece goods onto the pallet or onto a layer of piece goods already disposed on the pallet, is lowered by the height of such piece goods layer.

In heretofore known automatic apparatus for palletizing e.g. sacks the pallet goods are rotated in dependence upon their sizes and shapes and are then formed into goods layers which are deposed onto a pallet. The individually prearranged piece goods layers are transferred by means of a transfer bar onto a packing plate which serves as a transfer device. From the packing plate, the piece goods are again transferred onto a pallet which is disposed on a platform that may be raised and lowered. After every deposition of a layer of piece goods onto a pallet or onto one or several layers of piece goods already disposed on the pallet, the platform carrying the pallet is lowered by the height of the deposited piece goods layer and then raised again in an upward direction toward the movable packing plate.

A drawback of such prior art palletizing apparatus is that every pallet may only be loaded with a specific type of piece goods. In cases in which piece goods of different types such as small and big size piece goods are supplied to the palletizing apparatus and when a pallet disposed at a given instant within the palletizing apparatus is to be loaded exclusively with small piece goods then big size piece goods supplied to the palletizing apparatus must be withheld until the pallet has been loaded completely with small size piece goods. Another procedure would be to remove a pallet that is partially loaded with small size piece goods from the palletizing apparatus and to introduce into the apparatus a new pallet for stacking thereon the big size piece goods supplied. Both these procedures are cumbersome and rather time consuming and lead to a substantial loss of efficiency of such palletizing apparatus.

It is therefore an object of the present invention to provide a novel and improved palletizing apparatus for piece goods.

It is another object of the present invention to provide a palletizing apparatus for piece goods allowing to selectively and without wasting time load a plurality of pallets with different types of pallet cargo whereby each pallet is allotted a specific type of pallet goods.

In accordance with the present invention there is now proposed an apparatus for loading pallets with piece goods such as sacks, cardboard boxes, crates or the like of the type specified above, and this novel apparatus is characterized by a gantry shaped frame including a packing plate; a storage and transfer track for a plurality of pallets that are empty or partially loaded with piece goods of various sized and different contents and adapted to be fetched individually into a pallet loading region defined underneath the packing plate for transferring palletizing goods onto a pallet; the pallets adapted to be moved along the storage and transfer track; and means for raising and lowering individual pallets when in a position underneath the packing plate.

Further advantageous embodiments of the palletizing apparatus of the present invention will be described in the following with reference to the illustrative embodiments shown in the appended drawings wherein FIG. 1 is a lateral elevational view of an apparatus for loading pallets with piece goods;

FIG. 11 is a schematical lateral elevational view of an automatic apparatus for loading pallets with sacks; and FIG. 12 is a schematical top view of the apparatus shown in FIG. 11.

Figure 1:
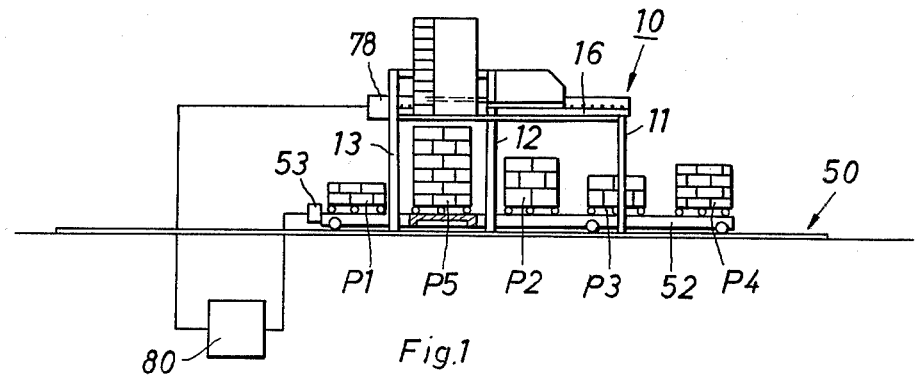
Figure 2:
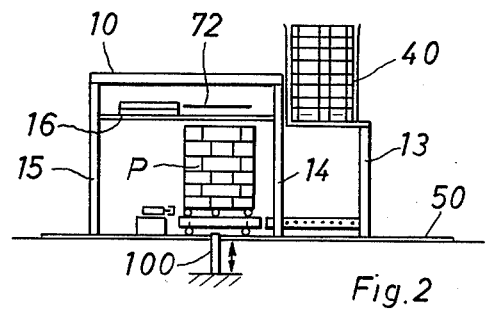
FIG. 2 is a front elevational view of the apparatus shown in FIG. 1.
Figure 3:
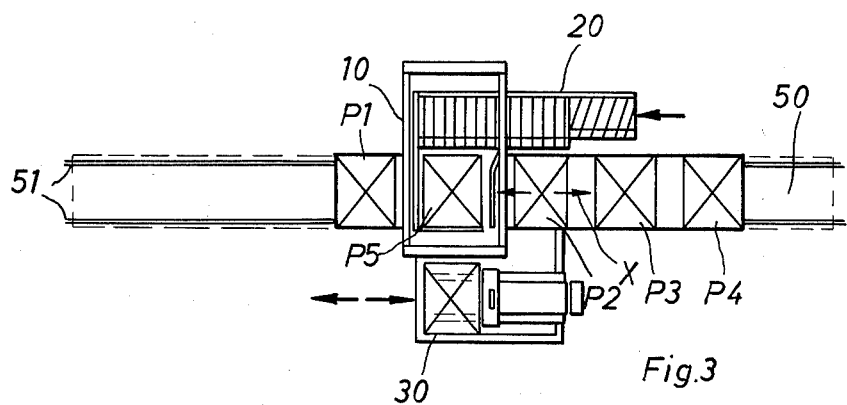
FIG. 3 is a top view of the apparatus shown in FIG. 1.

Referring to FIGS. 1 to 3, the apparatus for loading pallets with piece goods of the present invention includes a frame 10 which is gantry shaped as may be seen best in FIG. 2. The machine frame 10 includes a plurality of vertical support columns of which the support columns 11, 12, 13, 14 and 15 are shown, as well as a platform 16. The frame 10 furthermore comprises devices for forming individual piece good layers, devices for transferring such piece goods layers onto a packing plate by means of a transfer bar, and devices for raising and lowering pallets that are to be loaded with piece goods. The reference numeral 20 indicates a conveyor belt for supplying palletizing goods into the apparatus. The loaded pallets P are removed from the frame 10 in a lateral direction as shown at 30. Empty pallets are supplied likewise in a lateral direction from the pallet supply magazine 40 that is arranged to one side of the frame 10. A storage and transfer track 50 is arranged underneath the frame 10. Several empty or partially loaded pallets such as P1, P2, P3, P4 and P5 may be moved by means of transfer carts along the storage and transfer track 50. These transfer carts will be described more in detail further below.

With reference to FIGS. 11 and 12 there will now be described an embodiment of an apparatus for loading pallets with sacks. Within the machine frame 10 there is arranged a continuous conveyor belt 61, and another conveyor belt 62 is arranged in-line at the downstream side of the conveyor belt 61. Guide bars 63, 64 arranged above the conveyor belt 62 serve to orientate the sacks supplied on the conveyor belt 61. On the downstream side of the conveyor belt 62 may be provided a vibrating table 65 for equalizing the contents of the sacks. A feed roller 66 serves to supply sacks in a precisely predetermined time sequence to the conveyor belt 61. The conveyor belt 61 will then move these sacks into a transfer region from which the sacks will be transferred onto the pallets. A plate shaped rotatable guide 68 and a stop pin 69 disposed above the conveyor belt 61 allow to rotate the sacks into a predetermined orientation for compound stacking. The same procedure is employed when loading retangular piece goods such as cardboard boxes or the like. After orientation, the sacks or other piece goods enter a space which is delimited by a rearwardly disposed, i.e. downstream registering bar 70 that extends in a direction parallel to the return roller of the conveyor belt 61. Within this confined space, the sacks are parpared for the transfer operation onto a pallet.

A transfer pusher bar 71 extends parallel to the feed direction of the conveyor belt 61 adjacent to one edge thereof and allows to transfer a layer of sacks or the like onto a packing plate 72. The packing plate 72 is disposed laterally of the conveyor belt 61 and above the pallet P. The upper surface of the packing plate 72 is coplanar with the upper surface of the conveyor belt 61 (see FIG. 11). The size of the packing plate 72 approximately corresponds to the size of the useable pallet loading area. The thickness of the packing plate 72, i.e. the vertical dimension of the packing plate is smaller than the thickness of the pallet. The packing plate 72 may be moved in a direction parallel to the feed direction of the conveyor belt 61.

An unloaded pallet P is arranged on an elevating platform 75 that may be raised and lowered and is guided toward this end in lateral guides 76 of the machine frame 10. The overall arrangement is such that when withdrawing the packing plate 72 from underneath a layer of sacks the sacks will be transferred onto the pallet P without undergoing any substantial deformations. Subsequently to transferring the sacks onto the pallet, the elevating platform 75 is lowered together with the pallet P by the height of the layer of sacks whereby a clearance is provided for the next following layer of sacks and the packing plate 72 may be returned into the loading position.

A fully loaded pallet is pushed by an empty pallet onto a lead-away track not shown in the drawings. The empty pallet is supplied from the pallet supply magazine 40. Along the lead-away track (not shown) the loaded pallets may be moved to another point of destination. After the loaded pallet has been led off, the empty pallet is transferred by means of the elevating platform 75 into the upper loading position. In the meantime, another packing layer has been arranged on the packing plate 72, and this packing layer will be transferred from the packing plate 72 onto the empty pallet as soon as this empty pallet has been moved into the loading position.

The storage and transfer track 50 is provided for simultaneously feeding to the palletizing apparatus several different types of cardboard boxes or sacks with different contents and for palletizing such boxes or sacks in the form of layers. As shown in FIGS. 1 to 3, the storage and transfer track 50 comprises guide rails 51 for a pallet transfer cart 52 which is movable along the guide rails 51 in the direction of the arrows $x$ in FIG. 3. The pallet transfer cart 52 may be moved by hand or by means of a driving motor 53. A driving mechanism 78 for controlling the operative cycles of the palletizing apparatus and the driving motor 53 for the pallet tranfer cart 52 are connected to a control system 80 to which is likewise connected an elevating mechanism 100 for raising and lowering the pallets so that feeding of a pallet into the loading region of the palletizing apparatus may be effected automatically in synchronism with palletizing goods supplied to the palletizing apparatus. This feature allows that in the palletizing apparatus there is on stand-by for every type of palletizing goods on the pallet cart 52 a pallet whereby the different types of palletizing goods may be prearranged in layers and then deposited onto a corresponding pallet.

The operation of the palletizing apparatus of the present invention is as follows: As soon as enough piece goods for forming a piece goods layer of one type of palletizing goods are available in a piece goods store not shown in the drawings then these piece goods of one type will be fetched and supplied to the palletizing apparatus. Simultaneously, the pallet transfer cart 52 is moved so as to shift a corresponding pallet into the pallet loading position. Then the pallet is raised by means of the elevating mechanism 100. During these operations, the piece goods to be loaded onto the pallet have already been assembled on the packing plate 72 which overlies the pallet. By withdrawing of the packing plate 72 the piece goods layer assembled on the packing plate is transferred onto the pallet or onto the upper surface of one or several piece goods layers already disposed on a partially loaded pallet. Subsequently, the entire pallet is lowered again onto the pallet transfer cart 52. The palletizing apparatus is then again on stand-by for palletizing a next succeeding layer of piece goods.

If a pallet has not yet been fully loaded and it is desired to palletize another type of piece goods then the partially loaded pallet disposed in the loading region is moved along the storage and transfer track 50 towards the one or the opposite side of the track, and a pallet for receiving the new type of the piece goods is moved into the loading region of the palletizing apparatus.

In the embodiment shown in FIGS. 1 to 3, there is a single storage and transfer track 50 provided underneath the gantry type machine frame 10 of the palletizing apparatus.

Figure 4:
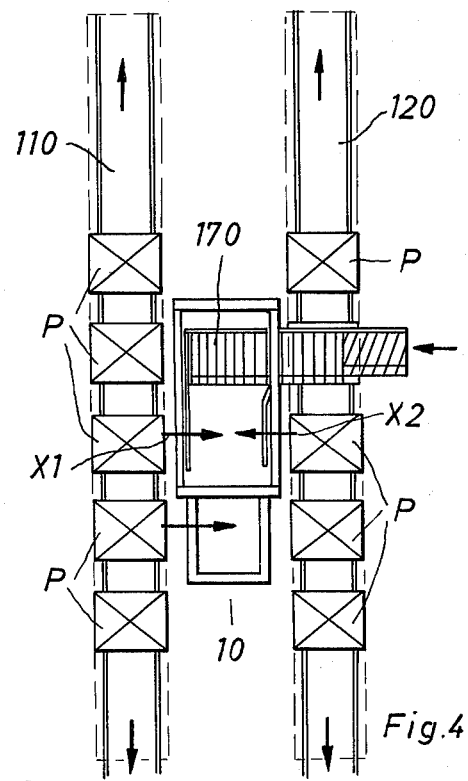
FIG. 4 is a top view showing another embodiment of an apparatus for loading pallets with piece goods, the apparatus comprising a pair of parallel storage tracks.

In the embodiment shown in FIG. 4 there is provided a pair of mutually spaced storage and transfer tracks 110 and 120. Pallets on either of these two storage and transfer tracks 110, 120 may be moved into the loading region of the palletizing apparatus. Toward this end, the pallets disposed on the pallet transfer cart 52 are provided with devices for transferring the pallets into the loading region of the palletizing apparatus. These transfer devices may e.g. consist of roller tracks and allow to move the pallets in the directions of the arrows $x1$ and $x2$.

Figure 5:
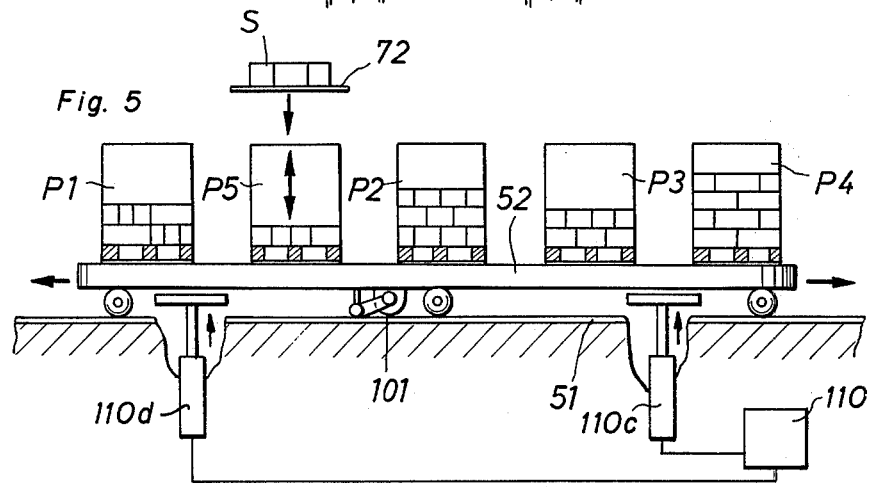
FIG. 5 is a lateral elevational view showing several pallets arranged on a storage track in the form of a movable transfer track, the pallets being adapted to be raised or lowered by means of a common elevating mechanism.

FIG. 5 shows a pallet transfer cart 52 for receiving several pallets P1 to P5. The palletizing station is indicated in this FIG. at S. Each pallet on the pallet transfer cart 52 may be provided with an elevating mechanism as schematically shown at 101.

Alternatively, an elevating mechanism which lifts the entire transfer truck 52 may be provided. Such a mechanism, as shown in FIG. 5, includes hydraulic lifting cylinders 110c and 110d and a hydraulic drive mechanism 110.

Figure 6:
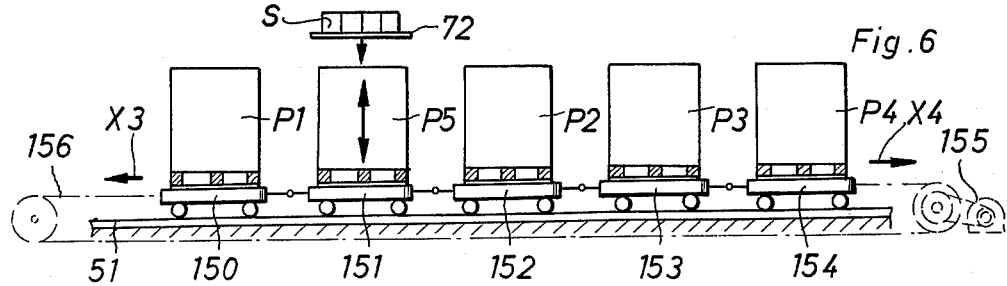
FIG. 6 is a lateral elevational view of another embodiment of the storage track with an elevating mechanism disposed in the loading region of a pallet, the elevating mechanism serving to lift a pallet being loaded.

As shown in FIG. 6, a pallet transfer cart 150, 151, 152, 153, 154 may be provided for every pallet. A stationary driving mechanism 155 allows to move the pallet carts 150 to 154 that are coupled to each other by means of a cable line 156 in the direction indicated by the arrows x3 or x4.

Figure 7:
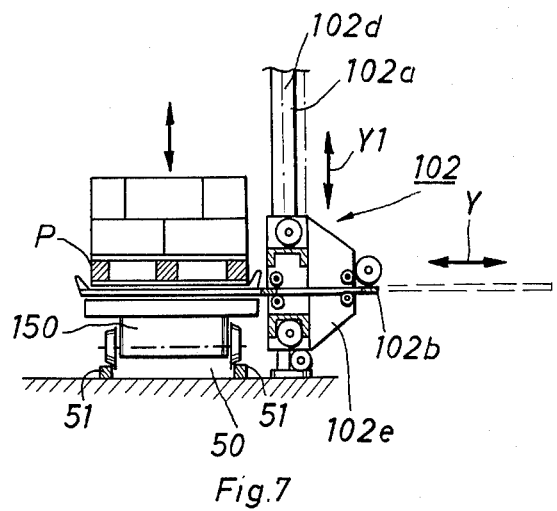
FIG. 7 is a vertical sectional view, partly in elevation and partly in cross-section, showing a transfer track with a transfer cart disposed thereon and carrying a pallet, and a stationary lifting fork type elevating mechanism.
Figure 8:
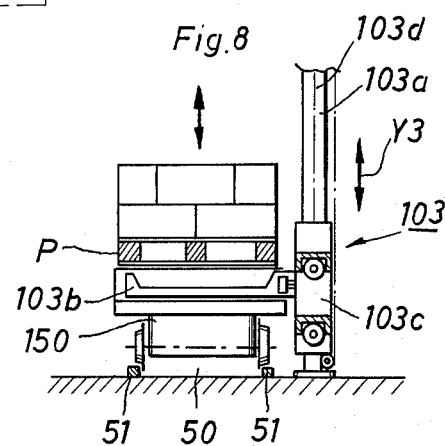
FIG. 8 is a vertical sectional view partly in elevation and partly in cross-section showing another embodiment of the elevating mechanism in which the lifting fork is arranged on the transfer cart and adapted to be coupled to a stationary elevating mechanism.
Figure 9:
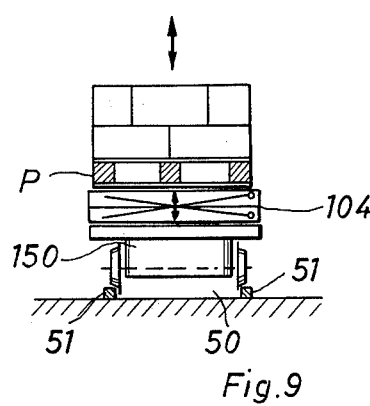
FIG. 9 is a front elevational view of an elevating mechanism arranged on a transfer cart for pallets.

FIGS. 7 to 9 show different embodiments of elevating mechanisms. Referring first to FIG. 7, there is shown a stationary elevating mechanism 102 consisting of an upright column 102a and a lifting fork 102b. The lifting fork 102b is adapted to be inserted between the pallet cart 150 and the pallet P. The lifting fork 102b is movable by means of driving mechanism not shown in the drawing and through a carriage 102e in a horizontal direction (arrow y). When it is intended to move pallet transfer cart 150 together with the pallet P thereon, then the lifting fork 102b is withdrawn from the pallet P. If the lifting fork 102b is extended underneath the pallet P then vertical movements of the lifting fork 102b in the direction of the arrow y1 allow to raise or lower respectively the pallet P.

Referring to FIG. 8, every transfer cart 150 to 154 may be provided with a lifting fork 103b of a stationary elevating mechanism 103. This elevating mechanism 103 likewise comprises a vertical column 103a having a coupling member 103c adapted to be moved in the direction of the arrow y3. The free end of the lifting fork 103b may be coupled to the coupling member 103c. This elevating mechanism 103 is provided in the loading region of the palletizing apparatus in a manner similar to the elevating mechanism 102. The vertical drive of the lifting fork 102b or of the coupling member 103c may be effected by means of an elevating chain indicated at 102d and 103d respectively.

The elevating mechanism 103 shown in FIG. 8 operates so as to allow raising or lowering in a vertical direction any pallet that has been moved into the loading region by coupling the lifting fork 103b to the coupling member 103c.

Figure 10:
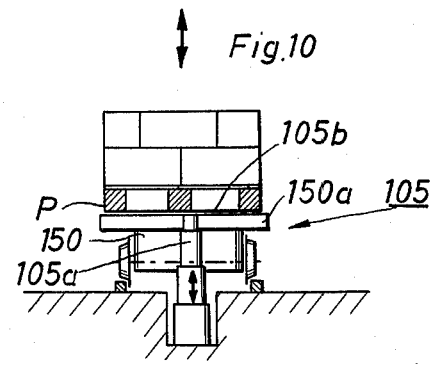
FIG. 10 is a front elevational view of a stationary elevating mechanism adapted to extend through the transfer cart.

Referring to FIG. 9, every pallet transfer cart 150 to 154 may be provided with an individual elevating mechanism schematically indicated at 104. This elevating mechanism may consist of a hydraulically operated piston-cylinder assembly. It would likewise be possible to provide a stationary elevating mechanism 105 in the loading region of the palletizing apparatus (see FIG. 10). In the latter case, the transfer cart 150 for the pallet P comprises a support frame 150a through which the elevating cylinder 105a extends. At the upper free end of the elevating cylinder is secured a support plate 105b.

The palletizing apparatus of the present invention is not intended to be restricted to the above described embodiments which are shown in the appended drawings. Modifications of the arrangement and design and of the number of storage and transfer tracks are considered to be covered by the scope of the present invention, and likewise elevating mechanisms of different types. It could also be considered employing palletizing apparatus having lifting platforms for the pallets. In that case, the pallets would be supplied to the lifting platform. Instead of a transfer device in the form of a packing plate the palletizing apparatus may likewise be provided with a vacuum transfer system in combination with storage and transfer tracks. Similarly, the term "palletizing apparatus" is intended to also include "depalletizing apparatus", i.e. apparatus for unloading pallets.

As may be seen from the foregoing, the present invention has provided a palletizing apparatus for loading pallets allowing to palletize cargo of different sizes and of different contents onto pallets specifically assigned to one type of cargo. This feature is provided by a storage track adjacent to the palletizing apparatus. The storage track system allows to shift the pallets into or away from a loading region or to keep the pallets in stand-by positions until being fetched for receiving cargo or additional cargo. This arrangement allows to achieve very high loading speeds and an increased efficiency in comparison to prior art palletizing apparatus.

What is claimed is:

1. Apparatus for loading parcels of diverse configurations such as bags, cartons and the like, upon a plurality of pallets, with each individual pallet of said plurality of pallets having loaded thereon parcels of uniform configuration, said apparatus comprising, in combination, a gantry, a packing plate arranged in said gantry, conveyor means for supplying parcels to said packing plate, elevator means for raising and lowering said packing plate, a transfer stationed defined adjacent said conveyor means at which parcels loaded upon said packing plate may be transferred to a pallet placed beneath said packing plate, conveyor track means extending alongside said transfer station including means for moving a plurality of pallets into and out of transfer position relative to said transfer station, said pallets having said parcels transferred thereupon from said packing plate when said pallets are in said transfer position, and pallet transfer means extending transversely to said conveyor track means for selectively bringing individual pallets into and out of said transfer position in accordance with the configuration of parcels to be transferred thereto in order to enable formation upon individual ones of said pallets of stacks of parcels of generally uniform configuration, said conveyor track means being located relative to said transfer station to enable both empty and partially loaded pallets to be maintained in standby position and to be moved into transfer position relative to said transfer station when parcels having a given configuration are to be transferred to a predetermined pallet assigned thereto.

2. Apparatus according to claim 1 including additional conveyor track means arranged adjacent to said conveyor track means for feeding or removing pallets.

3. Apparatus according to claim 2 wherein said conveyor track means include at least one pallet conveyor track extending in a given direction relative to said transfer station and wherein said additional conveyor track means includes at least one conveyor track extending transversely to said pallet conveyor track, with said pallet transfer means being provided in a region adjoining the region where said at least one conveyor track extends transversely to said pallet conveyor track.

4. Apparatus according to claim 1 wherein said conveyor track means include a pair of parallel pallet conveyor tracks juxtaposed on opposite sides of said gantry and of said packing plate.

5. Apparatus according to claim 1 wherein said conveyor track means comprise guide rails and wherein said apparatus further comprises transfer trucks running upon said guide rails for moving said pallets on said guide rails.

6. Apparatus according to claim 5 including means for raising and lowering pallets from said transfer trucks at said transfer station, 7. Apparatus according to claim 5 including means at said transfer station for raising and lowering said transfer trucks with pallets contained thereon.

8. Apparatus according to claim 5, including a lifting mechanism arranged in a position relative to said transfer station for raising and lowering said pallets, said lifting mechanism comprising a vertical column arranged laterally of said pallet conveyor tracks, a lifting fork arranged to be horizontally extended and retracted for engagement beneath said pallets and drive means for vertically driving said lifting fork in a vertical direction along said column.

9. Apparatus according to claim 8 wherein a lifting fork is arranged on each transfer truck and wherein said lifting mechanism includes a carriage adapted to be coupled with each lifting fork arranged on a transfer truck, said carriage being connected to be lifted and lowered by said lifting mechanism.

10. Apparatus according to claim 5 wherein each of said transfer trucks is individually provided with a lifting mechanism for lifting and lowering pallets thereon.

11. Apparatus according to claim 5 wherein said transfer trucks are provided with a supporting frame for said pallets and wherein a lifting mechanism is provided in said transfer zone which can be conducted through said transfer trucks.

12. Apparatus according to claim 5 including a plurality of transfer trucks each connected with the other to enable simultaneous movement thereof with a motor driven cable line being provided for driving said transfer trucks on said pallet conveyor track.

* * * * *